United States Patent [19]

Thorsman, deceased et al.

[11] 3,919,917

[45] Nov. 18, 1975

[54] FASTENER FOR MOUNTING IN THROUGH HOLE PARTICULARLY IN WALL OR CEILING PANEL OR THE LIKE

[76] Inventors: Oswald Willy Thorsman, deceased, late of Nykoping, Sweden; by Mary Thorsman, administratrix, Mariebergs Gard, Nykoping; by Bengt Ahlstrand, adminstratrix, Kristinelundsvagen 42, Solna, both of Sweden

[22] Filed: Oct. 3, 1973

[21] Appl. No.: 403,297

[52] U.S. Cl. .......................................... 85/74; 85/71
[51] Int. Cl.² .......................................... F16B 33/10
[58] Field of Search .............. 85/74, 75, 76, 73, 66, 85/71, 79, 69, 70

[56] References Cited
UNITED STATES PATENTS

| | | | |
|---|---|---|---|
| 1,276,708 | 8/1918 | Bair | 85/75 |
| 2,018,251 | 10/1935 | Croessant | 85/71 |
| 2,653,334 | 9/1953 | Bay | 85/71 X |
| 3,196,733 | 7/1965 | Cohen et al. | 85/75 |

FOREIGN PATENTS OR APPLICATIONS

| | | | |
|---|---|---|---|
| 704,510 | 2/1954 | United Kingdom | 85/70 |
| 223,908 | 12/1957 | Australia | 85/76 |
| 420,728 | 5/1947 | Italy | 85/73 |
| 6,913,885 | 3/1971 | Netherlands | 85/74 |

*Primary Examiner*—Ramon S. Britts
*Attorney, Agent, or Firm*—Pollock, Philpitt & Vande Sande

[57] ABSTRACT

A fastener for fastening an article or the like to a wall or ceiling including a tubular portion adapted to be inserted into and to project through an aperture in the wall or ceiling. The tubular portion expands laterally in response to rotation of a screw and abuts the interior wall surface so as to fix the fastener in place. The tubular portion includes at least two expansible bodies which are coaxially arranged, both having outwardly arranged end portions which, upon axial contraction of the tubular portion bear tightly against the interior wall surface.

6 Claims, 10 Drawing Figures

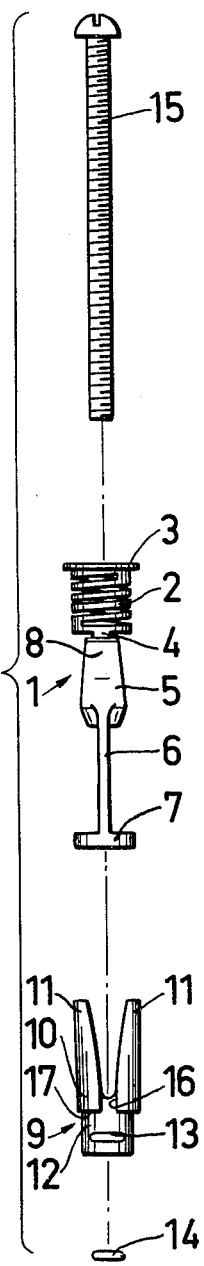
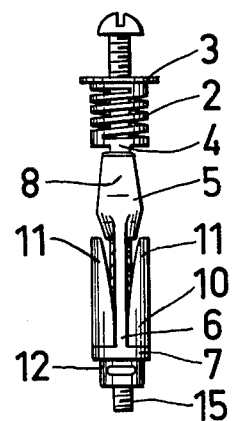
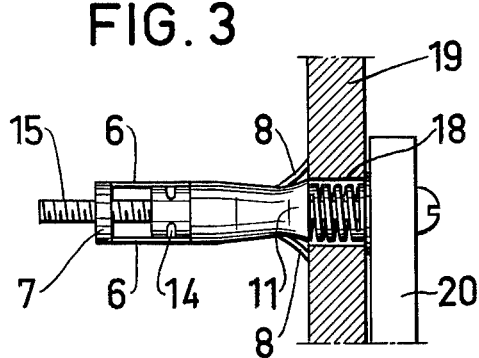
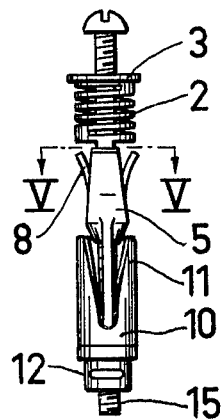
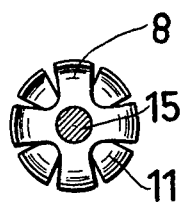

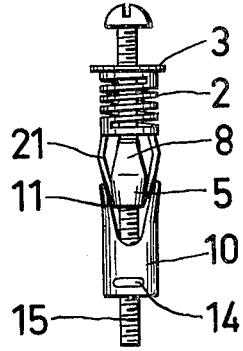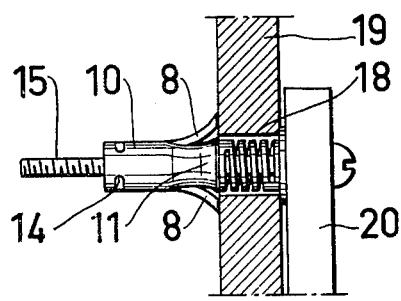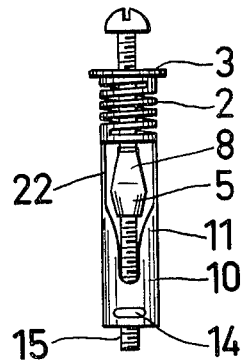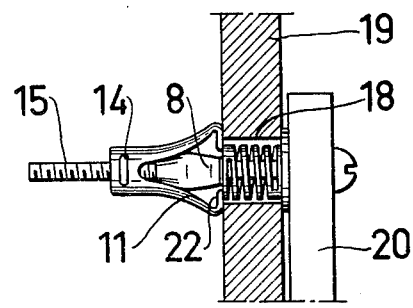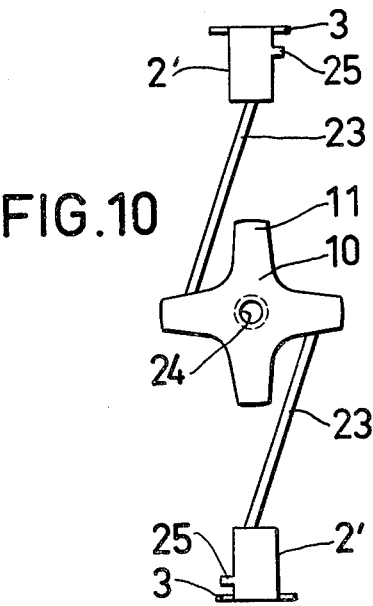

FASTENER FOR MOUNTING IN THROUGH HOLE PARTICULARLY IN WALL OR CEILING PANEL OR THE LIKE

This invention relates to a fastener for mounting in a hole preferably in wall or ceiling elements or the like. The fastener is intended to coact at its mounting with some suitable fastening member, preferably a screw, which subsequent to the mounting can be used, for example, to attach some object to the wall element or, for example, alternatively to constitute some kind of suspension means, for example a hook. The fastener comprises a portion adapted for insertion into the hole, which portion is formed expansible and upon mounting of the fastener expands by coaction with a fastening member in the form of a screw or the like so as to abut a contact surface, the orientation of which is substantially perpendicular to the extension of the hole.

BACKGROUND OF THE INVENTION

Fasteners of the aforesaid kind have been known for a long time in a great variety of embodiments for wall panels or the like, including fasteners having an expansible portion which by its expansion after mounting, abuts the rear surface of the wall panel. With some of these known fasteners, the expansible portion consists of one or more outwardly foldable arms. Other embodiments include a slit open portion, which expands upon mounting and abuts the rear surface. In a further known embodiment, the expansible portion is a body made of rubber or corresponding elastic material which as the time of mounting is compressed and expanded to abut the rear surface.

All of the previously known fasteners of the kind in question have in common that the hole in the panel is restrictive with respect to what can be inserted to the rear surface and thereby also limits the size of the contact surface, which is obtainable by the expansible portion against the rear surface of the panel and which determines the possible tensile strength of the fastener.

SUMMARY OF THE INVENTION

The present invention renders it possible to insert expansible material in spite of said restriction by the hole, which material substantially enlarges the contact surface obtainable with the known fasteners, so that by the present invention a tensile strength substantially exceeding that of the known fasteners can be obtained.

The invention is substantially characterized in that said fastener portion inserted through the hole in the wall element comprises at least two bodies, which are arranged one after the other in the direction of insertion of the fastener through the hole in the wall element and expansible transversely to said direction, and which are movable relative to each other to mutually abut each other so as to effect preferably both said bodies, but at least the body located closest to the outside of the wall element, to abut the contact surface, and that at least the other body is formed slit open.

It is, thus, possible, owing to this design of the fastener according to the invention, to insert through the hole in the wall element at least two bodies, which are expansible to abut the contact surface and each of which has a dimension corresponding to the hole dimension, i.e. a dimension for each of said bodies which renders possible a contact surface corresponding to the total contact surface obtained with the previously known fasteners. The movability of the bodies to mutual abutment involves the further advantage that the body, which is located closest to the outside of the wall element and in any mounting case is to abut the contact surface, is supported by the body located behind, so that the fastener can be tightened with greater force.

When in this conjunction reference is made to expansible bodies, it is to be observed that this term covers all such bodies, which can be so deformed from their existing form or be so folded out from the position they assume with the penetration through the hole in the wall element, that said abutment is achieved.

BRIEF DESCRIPTION OF THE DRAWINGS

The invention can be realized in a great number of different embodiments. In the following, some of these embodiments are described in greater detail with reference to the accompanying drawings.

FIG. 1 shows an exploded view of one embodiment of the fastener according to the invention.

FIG. 2 shows the fastener according to FIG. 1 in assembled state.

FIG. 3 shows the fastener according to FIGS. 1 and 2 in mounted state, for example on a wall panel.

FIG. 4 shows another, slightly modified embodiment of a fastener according to the invention, in a view corresponding to FIG. 2.

FIG. 5 shows on a larger scale a view of a mounted fastener along the section marked by the line V—V in FIG. 4.

FIGS. 6 and 7 show a further embodiment of a fastener according to the invention in unmounted and, respectively, mounted state.

FIGS. 8 and 9 show still another embodiment of a fastener according to the invention in unmounted and, respectively, mounted state.

FIG. 10, finally, shows a further embodiment of a fastener according to the invention, but in a position prior to its assembly to a fastener ready for use.

DETAILED DESCRIPTION OF THE PREFERRED EMBODIMENTS

The fastener shown in FIGS. 1–3 comprises, as it is most clearly apparent from the exploded view in FIG. 1, a first part 1 consisting of a sleeve 2 provided with a collar 3, a first expansible body 5 connected by strips 4 with the sleeve 2, and an annular sleeve 7 connected by strips 6 with the body 5. The expansible body 5 is provided with a central bore (not shown) and, seen from the upper end in FIG. 1, partially slit open to form two outwardly foldable wings 8. The strips 4 are connected with the body 5 some distance below the outer edges of the wings 8 in order not to prevent the wings from being folded outwardly. The sleeve 2, as shown by way of example, is formed as a helical spring. The outer dimension of the sleeve 7 agrees substantially with that of the sleeve 2.

Fasteners according to FIGS. 1–3 further comprise a second part 9 comprising an expansible body 10, which is slit open, in a manner similar to that of the body 5, from the upper end to form two outwardly foldable wings 11. The lower cylindrical portion 12, which cannot be folded outwardly and is provided with a central bore (not shown), includes a recess 13 for inserting therein a nut 14 aligning with the central bore.

The fastener is designed for coaction with a screw 15. FIG. 2 shows a fastener assembled with the screw in a position prior to the attachment to a wall or the like. The strips 6 for the part 1 are here guidedly held in the part 9 in a groove 16 formed between the lower portion of the wings 11 which is connected with the portion 12. The sleeve 2 for the part 1 surrounds slidably the portion 12 and in this position abuts the shoulder 17 disposed between the wings 11 and the portion 12. The wings 11 for the part 9 are hereby disposed perpendicularly to the wings 8 for the part 1. The screw 15 is drawn through the central bores in the sleeve 2, the body 5 for the part 1, the portion 12 for the part 9 and is threaded through the nut 14. The wings 8 and 11 for the expansible bodies 5 and, respectively, 10, which are arranged one after the other along the screw 15, are in this position prior to the mounting disposed substantially inside the periphery of the shell of the sleeve 7 or can be pressed to or inside said periphery. The two expansible bodies 5 and, respectively, 10 can, thus, for mounting on a wall or the like be inserted through a hole therein, which is slightly greater than the sleeve 7 and thereby renders it possible to insert the sleeve 7 as well as the sleeve 2 having substantially the same dimension as the sleeve 7.

The fastener shown in mounted state in FIG. 3 has been inserted, by using the screw 15 as a grip, through a hole 18 in a wall element 19 until the collar 3 abuts the outer surface of the wall element. The fastener is shown in a view seen from the side in FIG. 2. FIG. 3 further shows an object 20 fastened on the wall 19 by the fastener in coaction with the screw 15. Upon screwing in the screw 14 by coaction with the nut 14, the part 9 is guidedly moved relative to the part 1, in such a manner that the wings 8 of the part 1 as well as the wings 11 of the part 9 actively abut the rear surface of the wall 19. The resulting contact surface with the rear surface of the wall, thus, is substantially twice as great as that obtained by conventional fasteners having only one spreading (expansible or foldable) body. The load, moreover, is advantageously distributed on two bodies, and also the pressure on the rear surface of the wall is distributed in an advantageous uniform manner around the hole. The wings 11 for the body 9, furthermore, overlap somewhat the wings 8 for the part 1 and thereby bring about additional resistance to the outward folding of the wings, whereby the possible contact pressure against the rear surface of the wall element is increased still more, compared with the arrangement of only one expansible body. The sleeve 2 is designed as a spring for being able to apply one and the same fastener for wall elements of different thicknesses.

FIG. 4 shows an embodiment in unmounted state which corresponds generally with the embodiment shown in FIGS. 1–3, except that the expansible bodies, which also here are designated by 5 and, respectively, 10, are provided each with four wings 8 and, respectively, 11, in such a manner that the wings 11 as shown are preferably offset 45° relative to the wings 8 in order to distribute in mounted position of the fastener the contact pressure uniformly on the contact surface.

FIG. 5 is intended to show how, in principle, the wings for the two expansible bodies are arranged relative to each other in mounted position of the fastener, whereby in addition to the large contact surface there is provided also an advantageous load distribution against the contact surface around the hole in the wall element. The same applies, of course, in a corresponding manner to the other embodiments shown and described.

In the embodiment according to FIG. 4 and also in the subsequent description of other embodiments with reference to the accompanying drawings, the reference characters for corresponding details are the same as in the embodiment according to FIGS. 1–3.

FIGS. 6 and 7 show each other embodiments of a fastener according to the invention. FIG. 6 shows the fastener in the position prior to the mounting on a wall element 19, and FIG. 7 shows the fastener in the position mounted on the wall element. In said latter position, the fastener is shown in a view seen from the side in FIG. 6. In this embodiment, the expansible body 5 located closest to the sleeve 2 is arranged loosely slidably along the screw 15, from the uppermost position adjacent the sleeve 2 in FIG. 6 to a position down in the central bore in the second expansible body 10 shown in FIG. 7 for the mounted fastener. From the sleeve 2 in this embodiment extend strips 21, which are connected with the second expansible body 10 a distance beneath the outer edges of the wings 11. In mounted state subsequent to the tightening of the screw 15, the wings 8 and, respectively, 11 of the expansible bodies 5 and 10 are pressed against the contact surface, i.e. the rear surface of the wall element 19, in the same manner as with the fastener shown in FIGS. 1–3.

The fastener shown in FIGS. 8 and 9 in unmounted and, respectively, mounted position agrees with the embodiment shown in FIGS. 6 and 7, except that the strips extending from the sleeve 2 and here designated by 22 are connected with the wings 11 for the expansible body 10 at the outer wing ends, whereby in mounted position, as shown in FIG. 9, an abutment for the wings 11 and the strips 22 is obtained.

In FIG. 10, finally, still another embodiment is shown, but in this case there is shown a manufactured initial piece used to form one of the expansible bodies 5 or 10, (in this case, the body 10). In the embodiment shown the body 10 is provided with four wings 11 which are connected by strips 23 to each sleeve half 2' to form the sleeve 2. Besides, instead of the inserted nut 14, a threaded hole 24 is provided directly in the body 10. Upon assembling the fastener, the wings 11 are folded inwardly to form a body corresponding to the body 10 shown in FIG. 4, and the sleeve halves 2' are joined, for example, by means of hooks or the like indicated by 25. The second expansible body, i.e. as shown here by way of example the body 5, is assembled with the body 10 and the screw 15 is screwed into the assembled fastener.

In the embodiments of different fasteners according to the invention, the fasteners are secured in through holes 18 in wall elements 19 in the form of panels, for example plaster boards, in such a manner, that the expansible bodies 5 and 10 at the time of mounting are displaced relative to each other and expanded outwardly to abut the rear surface of the wall element. This is supposedly the most usual application of the fastener according to the invention, but also other applications can be imagined. One such other possible application is particularly the mounting of fasteners according to the invention within holes in walls of a porous material, for example lightweight concrete.

In such a material the expansible bodies will be displaced relative to each other and thereby a contact surface is formed in the material by cratering, against which contact surface both bodies will abut in an analogous manner as against the rear surface of the wall elements 19 shown.

The material in a fastener according to the invention may, for example, be a suitable plastic material, nylon, glass-fibre-reinforced nylon, rubber or metal.

The embodiments shown comprise expansible bodies slit open to form wings or the like. A fastener according to the invention is not restricted in this respect, but its bodies may have any form rendering the desired expansion and common abutment to the contact surface. The expansible bodies included in the same fastener may also have different shapes relative to each other. A fastener according to the invention is also not restricted, so as to include only two expansible bodies as shown, but more than two bodies may be arranged. In another modification, the portions of the expansible bodies which, in the mounted state of the fastener contact each other, i.e. for example, in FIG. 3 the overlapping surfaces between the bodies 5 and 10, may be provided with barbs or grooves in order to increase still more the resistance to expansion of the bodies and thereby also the possible tensile strength of the fastener.

In another modification, particularly for increasing the resistance to expansion of the body disposed closest to the outer surface of the wall element, the overlapping may be greater than shown; for example, the expansible portions of the body 10 may entirely overlap the expansible portions of the body 5, i.e. the expansible portions of the bodies are not, as shown for the different embodiments, laterally offset relative each other. The expansible portions of the body 10 may here abut the contact surface, i.e. as shown the rear surface of the wall element 19, or they may abut only the expansible portions of the body 5 without abutting the contact surface. The sleeve 2, furthermore, formed as a spring may be replaced by some other resilient member, or it may be formed as a rigid member. The collar 3 as shown is also not necessary in any case; instead, its function may be carried out, for example, by the object to be fastened on the wall.

As regards further modifications of shown embodiments of fasteners according to the invention, it may be mentioned that the inserted nut 14 can be replaced by a thread formed directly in the expansible body, and that also in certain modifications the nut or thread may be provided in the expansible body located closest to the hole in the wall. In other embodiments of fasteners according to the invention which coact with a fastening member other than a screw, it is, of course, possible to provide or form some other member coacting with such a fastening member in a suitable way. Further modifications are possible within the scope of the following claims.

It is claimed:

1. A fastener for mounting into a hole in a wall, ceiling, or the like for compression between the exterior and interior wall surfaces comprising:
   a tubular portion for insertion into and projection through a mating aperture in the wall element,
   said tubular portion including at least two expansible bodies which are coaxially arranged and slidable along a screw means and each of which is laterally expandable in response to axial compression, said two bodies being at least initially axially spaced along said screw means and being movable relative to each other at least axially in response to rotation of said screw means,
   each of said bodies having divergently movable bendable and circumferentially spaced portions whose free ends face the interior wall surface when said tubular portion is inserted into said aperture,
   means responsive to rotation of said screw means to move said end portions divergently outwardly into positions where their respective end portions abut the interior surface of the wall, said two expansible bodies being rotationally offset relative to each other and with the free end portions of one said body being received between the free end portions of the other said body upon rotation of said screw means to ensure thereby that their respective divergent portions exert forces against the interior wall surface which are circumferentially distributed around said aperture.

2. A fastener as defined in claim 1, characterized in that the expansible bodies have a similar shape relative to each other.

3. A fastener as defined in claim 1 characterized in that the expansible bodies have a different shape relative to each other.

4. A fastener as defined in claim 1, characterized in that the expansible body located in the mounted position closest to the aperture in the wall element is in said position partially overlapped with contact by the adjacent expansible body.

5. The fastener of claim 1 wherein at least one of said expansible bodies is axially slotted over a portion of its length extending from the end thereof which faces the interior wall surface.

6. The fastener of claim 1 wherein said tubular portion includes an axially resilient means extending between the adjacent end of the expansible body which is closest to the interior wall surface and a washer which abuts the exterior wall surface.

* * * * *